C. SONNEBORN.
RADIATOR OR COOLER.
APPLICATION FILED JUNE 22, 1916.

1,278,243.

Patented Sept. 10, 1918.
2 SHEETS—SHEET 1.

WITNESSES
INVENTOR
Charles Sonneborn
By Fred'k W. Winter
Attorney

C. SONNEBORN.
RADIATOR OR COOLER.
APPLICATION FILED JUNE 22, 1916.

1,278,243.

Patented Sept. 10, 1918.
2 SHEETS—SHEET 2.

WITNESSES
W. T. Holman
Jo. Baily Brown

INVENTOR
Charles Sonneborn,
By Fredk W. Winter
Attorney

UNITED STATES PATENT OFFICE.

CHARLES SONNEBORN, OF WEST PITTSBURGH, PENNSYLVANIA, ASSIGNOR TO PRESSED METAL RADIATOR COMPANY, OF PITTSBURGH, PENNSYLVANIA, A CORPORATION OF PENNSYLVANIA.

RADIATOR OR COOLER.

1,278,243.      Specification of Letters Patent.      Patented Sept. 10, 1918.

Application filed June 22, 1916. Serial No. 105,140.

*To all whom it may concern:*

Be it known that I, CHARLES SONNEBORN, a resident of West Pittsburgh, in the county of Lawrence and State of Pennsylvania, have invented a new and useful Improvement in Radiators or Coolers, of which the following is a specification.

This invention relates to radiators, which may be used either for the purpose of heating buildings, such as the ordinary steam or hot water systems, or for cooling liquids, such as water which circulates around the cylinders of gas engines, or oil used to cool transformers.

The object is to provide a construction that will allow a free circulation of a fluid therethrough, which will have a large amount of exterior metal surface exposed to the air in proportion to the amount of fluid contained in the radiator; to make a structure of wrought metal with all parts tightly welded together; the headers being of two pan-shaped parts welded at their edges to form an integral one-piece header; to weld the tubular connection members to the headers to form a reinforced tight joint on the inside of the header; to provide means for complete drainage; to avoid all pockets or recesses in which liquid might collect and stand; and to so construct all of the parts that the joints may be welded by the oxy-acetylene process, by joining the edges of two parallel flanges. Other objects and advantages of the invention will appear more fully in the specification, and will be apparent to those familiar with the art.

Heretofore radiators have been made in which the tubular body members have been welded, or brazed, to the headers, and the headers made of connected sections. But such structures have had pockets for the collection of liquid, the welding process has been necessarily expensive and cumbersome and the structures have been heavy. The present invention provides a radiator in which all of the parts may be of thin metal, which may be welded to form a single unit, and in which all of the parts to be welded are exposed and easily accessible at the time of welding, and which join with parallel edges exposed, giving a peculiarly good union for the welding process used.

Figure 2:
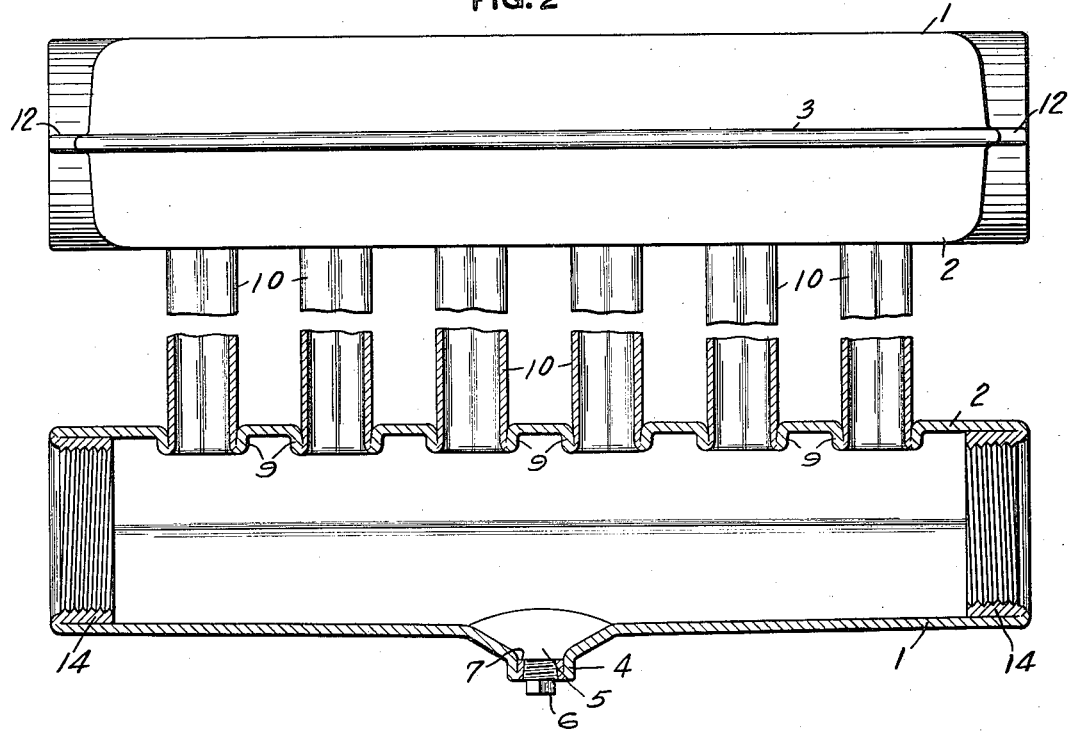
Figure 1:
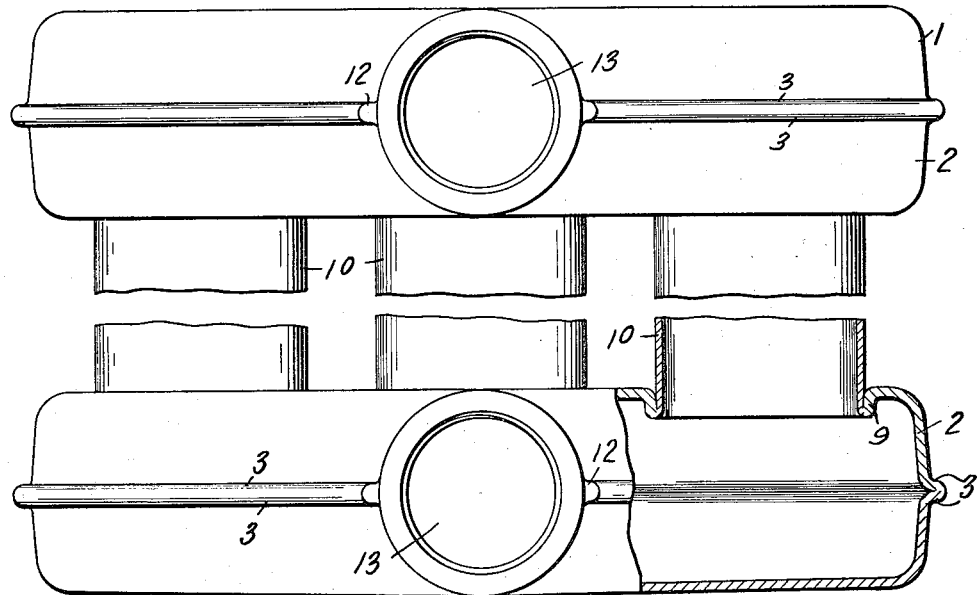
Figure 3:
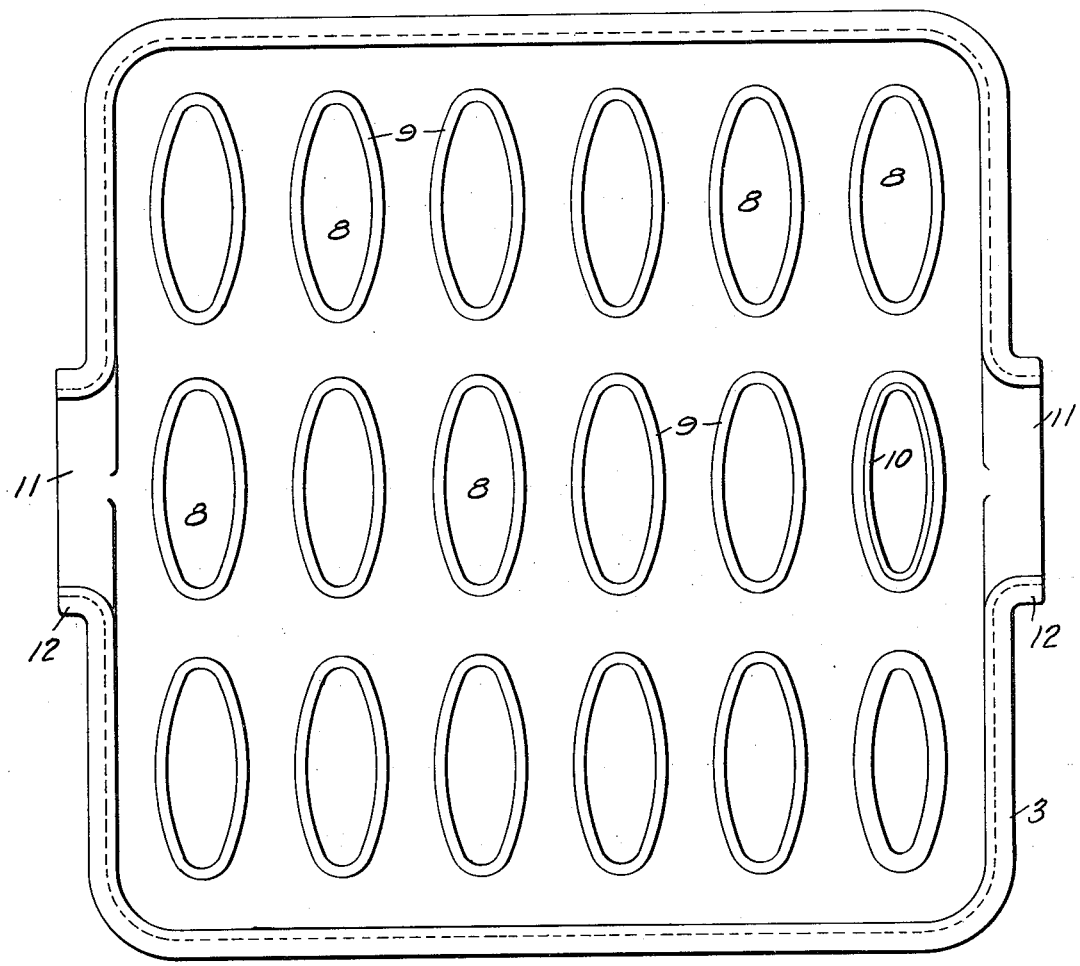
Figure 5:
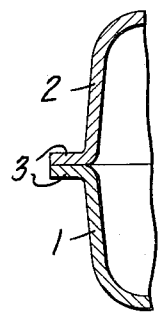
Figure 6:
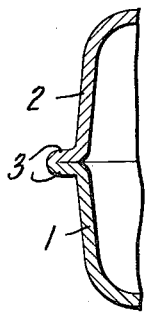

A form of radiator embodying the features of my invention is illustrated in the accompanying drawings, in which Figure 1 is an elevation of one end of the radiator with a part broken away; Fig. 2 is a partial longitudinal vertical section and a partial side elevation; Fig. 3 is a plan view of the inside of one of the header sections, showing the manner of fastening the tubular connecting members therein; and Figs. 4, 5 and 6 are sectional views showing the details of the joints before and after welding.

The header forming the base, or bottom member of the radiator, is built up from metal sheets, pressed into pan-shaped sections 1 and 2, the edges being flared outward to form a flange 3. The bottom member, 1, is slightly inclined from both sides to the central point, which is punched out forming a neck 4, having an opening 5 therein for receiving a drainage cock or plug 6. This opening is preferably internally threaded, or a threaded collar or inset 7 may be fixed therein to engage the plug 6, if the thickness of the neck 4 is not sufficient to carry the required threads, and this may be welded, as shown.

The flange of the upper member is of the same shape and perimeter as that of the lower member, and is adapted to have its edge coincident with the lower member when the two are oppositely disposed and laid face to face. Holes 8 are punched through this upper member, having slightly tapered flanges 9 extending inward some distance from the plane of the bottom surface. These holes are of the proper shape and size to receive tubular body members 10. At each end of the header members there is formed a semicircular opening 11, having an outwardly extending flange 12. When the two parts are laid one upon the other, to form the header, these semicircular openings form flanged holes 13, adapted to receive the ordinary fluid supply and outlet pipes of the radiator system. This flange 12 is threaded on the inside to engage the supply pipe, or, if the metal plate is too thin, a threaded collar or insert 14 may be set therein and properly fixed in position, such as by welding the outer end of said collars to the edges of the flanges, as shown at the ends of Fig. 2.

Figure 4:
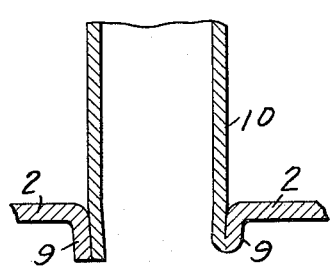

The tubular members 10 are forced under considerable pressure into the tapered flanged openings 8, until the ends of the tubular members and the edges of the flanges 9 are together, as shown at the left in Fig. 4, and at the right in the middle row of Fig. 3. An oxy-acetylene torch is then used to weld the edges to form a union, as shown at the right in Fig. 4 and at the right in the bottom row of Fig. 3, resulting in a joint, as shown at the right of Fig. 4.

When all of the body members have been welded into the header section 2, as above described, the other part 1 of the header is placed in position, having its flange coincident with the similar flange in the header member 2, as shown in Fig. 5, and by the same process these two flanges are welded together around their edges, forming a rigid union, as shown in Fig. 6. The upper header is similarly constructed, and similarly joined to the tubular body member. That is, the tubes are welded into the upper half of the bottom header and the other ends of the tubes into the lower half of the top header, and then the other halves of the headers are welded on as described. Thus all joints are made by welding exposed side by side edges. The upper header may be provided with a drain at one corner, and the bottom inclined to it, but this is not essential. Preferably, oblong, or flattened body members are used, in order that there may be the greatest possible exposure of radiating surface in proportion to the amount of fluid therein, as will be well understood.

By the construction above described a radiator is provided which has all of the parts rigidly connected, with all joints welded, forming an integral structure. By allowing the use of the oxy-acetylene welding process very thin sheet metal may be used in all the parts, giving more efficient and quicker radiation from the fluid. Heavy cast headers are avoided, the necessity of building up sections is avoided, and there are no pockets to collect fluid in any part. Any number of tubular body members may be used, of any desired form, and the radiator may be made of practically any desired size. If necessary, various units, such as the one here described, may be connected together in series.

I claim:—

1. In a radiator composed of headers and a plurality of tubular connection members, headers composed of sheet metal plates fastened together at their edges and having perforations therein to receive the tubular members, said perforations having internal tapered flanges to engage the ends of the tubular members.

2. In a radiator composed of headers and a plurality of tubular connection members, said headers being composed of sheet metal plates fastened together at their edges and having perforations therein to receive the tubular members, said perforations having flanges to engage the ends of the tubular members, the tubular members being welded to said flanges.

3. A radiator comprising headers formed of two pieces of sheet metal welded together, perforations in the headers having inwardly inclined flanges, and tubular members having their ends forced into the perforations and welded to the edges of said flanges on the inside of the header.

In testimony whereof, I have hereunto set my hand.

CHARLES SONNEBORN.

Witnesses:
  GLENN H. LERESCHE,
  A. E. JOHNSON.